(12) United States Patent
Liao et al.

(10) Patent No.: US 7,605,500 B2
(45) Date of Patent: Oct. 20, 2009

(54) MINIATURE GENERATOR

(75) Inventors: Chin-Lung Liao, No. 52, Hsueh-Hsiang Street, Toucheng City, Taipei Hsien (TW); Yi-Chih Chen, Taipei (TW)

(73) Assignee: Chin-Lung Liao, Taipei Hsien (TW)

( * ) Notice: Subject to any disclaimer, the term of this patent is extended or adjusted under 35 U.S.C. 154(b) by 225 days.

(21) Appl. No.: 11/839,506

(22) Filed: Aug. 15, 2007

(65) Prior Publication Data

US 2008/0042506 A1    Feb. 21, 2008

(30) Foreign Application Priority Data

Aug. 16, 2006  (TW) ................................. 095130143

(51) Int. Cl.
*H02K 21/12*  (2006.01)
*H02K 1/27*   (2006.01)
*H02K 35/02*  (2006.01)

(52) U.S. Cl. ................. 310/40 MM; 310/73; 310/75 C; 310/81; 310/166; 310/168

(58) Field of Classification Search ........... 310/40 MM, 310/73, 75 C, 81, 166, 168, 261; 362/192, 362/193, 473, 478, 500, 545
See application file for complete search history.

(56) References Cited

U.S. PATENT DOCUMENTS

| | | | | |
|---|---|---|---|---|
| 4,130,769 | A * | 12/1978 | Karube | 310/46 |
| 4,782,431 | A * | 11/1988 | Park | 362/161 |
| 5,668,423 | A * | 9/1997 | You et al. | 310/81 |
| 6,474,832 | B2 * | 11/2002 | Murray | 362/192 |
| 6,749,321 | B2 * | 6/2004 | Luo | 362/192 |

FOREIGN PATENT DOCUMENTS

JP    57193961 A  * 11/1982

* cited by examiner

*Primary Examiner*—Tran N Nguyen

(57) ABSTRACT

A miniature generator includes a carrier having a tubular shaft on the inside, a substantially C-shaped permanent magnet mounted on the tubular shaft inside the carrier, a match mounted on the tubular shaft inside the carrier and joined to the permanent magnet to keep the permanent magnet in a slightly unbalanced condition for allowing rotation of the permanent magnet upon movement of the carrier by an external force, and a winding holder sleeved onto the carrier and having wound thereon multiple windings for inducing an induction current upon rotation of the permanent magnet in the carrier.

3 Claims, 4 Drawing Sheets

MINIATURE GENERATOR

This application claims the priority benefit of Taiwan patent application number 095130143 filed on Aug. 16, 2006.

BACKGROUND OF THE INVENTION

1. Field of the Invention

The present invention relates to a power generator and more particularly, to a miniature generator, which has a permanent magnet mounted on a tubular shaft inside a carrier and kept by a match in a slightly unbalanced condition for rotation to induce windings of a winding holder upon movement of the carrier by an external force, thereby causing the windings to produce an induction current.

2. Description of the Related Art

Following fast development of technology in the progressive era, the industrial society has been gradually replaced by the knowledge society. In consequence, sophisticated electronic products have been continuously created. Nowadays, human living is not separable from "electricity". However, facing the crisis of energy shortage, every country around the world is trying hard to crease cost-effective, safe, environmentally protective substitutes having the characteristics of smaller size, lighter weight and higher energy density. Therefore, many miniature generators are created and intensively used in our daily life.

FIG. 4 illustrates a conventional miniature generator A. According to this design, the miniature generator A comprises a housing A1, an annular magnet A2 mounted inside the housing A and fastened to the inside wall of the housing A1, and an armature A3 rotatably mounted in the housing A1 at the center. When rotating the armature A3, a magnetic field effect between the armature A3 and the annular magnet A2 induces a current. The induced current is guided out of the miniature generator A through an electric brush A4 for application.

In actual practice, the aforesaid miniature generator has drawbacks as follows:

1. Because of the armature A3 is formed of a stack of silicon steel plates A31, a magnetic filed effect is produced between the armature A3 and the annular magnet A2 and the armature A3 is attracted to the flowing direction of the magnetic line of force. Therefore, the applied force must overcome the magnetic attractive force before rotating the armature A3, resulting in a big loss of energy.

2. The electric brush A4 is disposed at the top side of the armature A3 and electrically connected with the armature A3 for output of induced current. The electric brush A4 starts to wear after a long use. When the electric brush A4 starts to wear, the voltage will be relatively reduced and will become unstable, shortening the working life of the miniature generator A.

Therefore, it is desirable to provide a miniature generator that eliminates the aforesaid drawbacks.

SUMMARY OF THE INVENTION

The present invention has been accomplished under the circumstances in view. It is the main object of the present invention to provide a miniature generator, which is a cost-effective, safe and environmentally protective. The present invention utilizes gravitation and the force of the motion of a motion device to cause rotation of a permanent magnet that is kept in a slightly unbalanced condition inside a carrier, causing a change of the magnetic flux in windings of a winding holder around the carrier, and therefore an electric current is produced and outputted to an external circuit for application. The miniature generator of the present invention has the following features and benefits:

1. The invention eliminates the problem of energy loss caused in the prior art design to overcome the magnetic force that attracts the armature when rotating the magnet.

2. The miniature generator of the present invention needs not to use an electric brush, therefore the invention eliminates the drawbacks of unstable voltage and short working life of the prior art design.

3. The miniature generator of the present invention has a simple structure. For application under the crisis of energy shortage, the miniature generator of the present invention is cost-effective, safe and environmentally protective.

DETAILED DESCRIPTION OF THE PREFERRED EMBODIMENT

Figure 1:
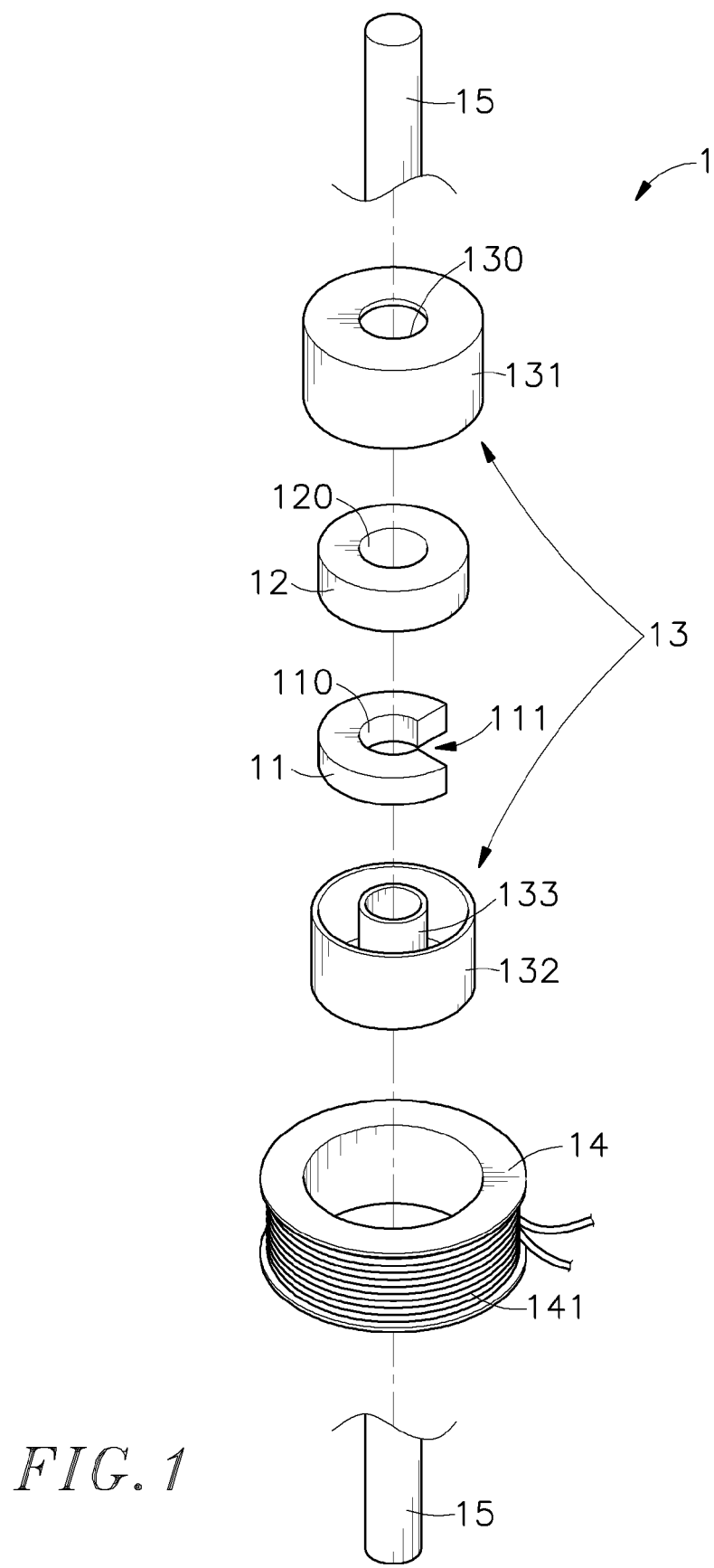
FIG. 1 is an exploded view of a miniature generator in accordance with the present invention.
Figure 2:
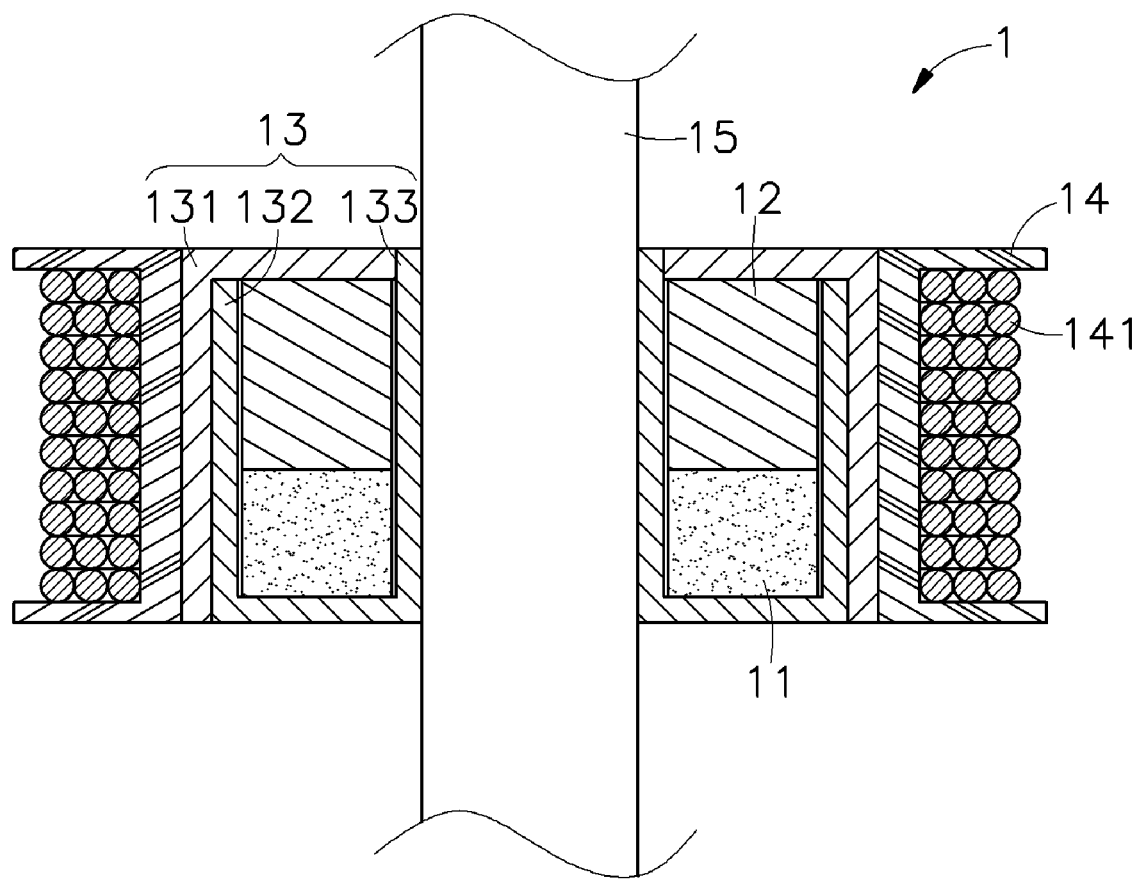
FIG. 2 is a sectional assembly view of the miniature generator in accordance with the present invention.
Figure 3:
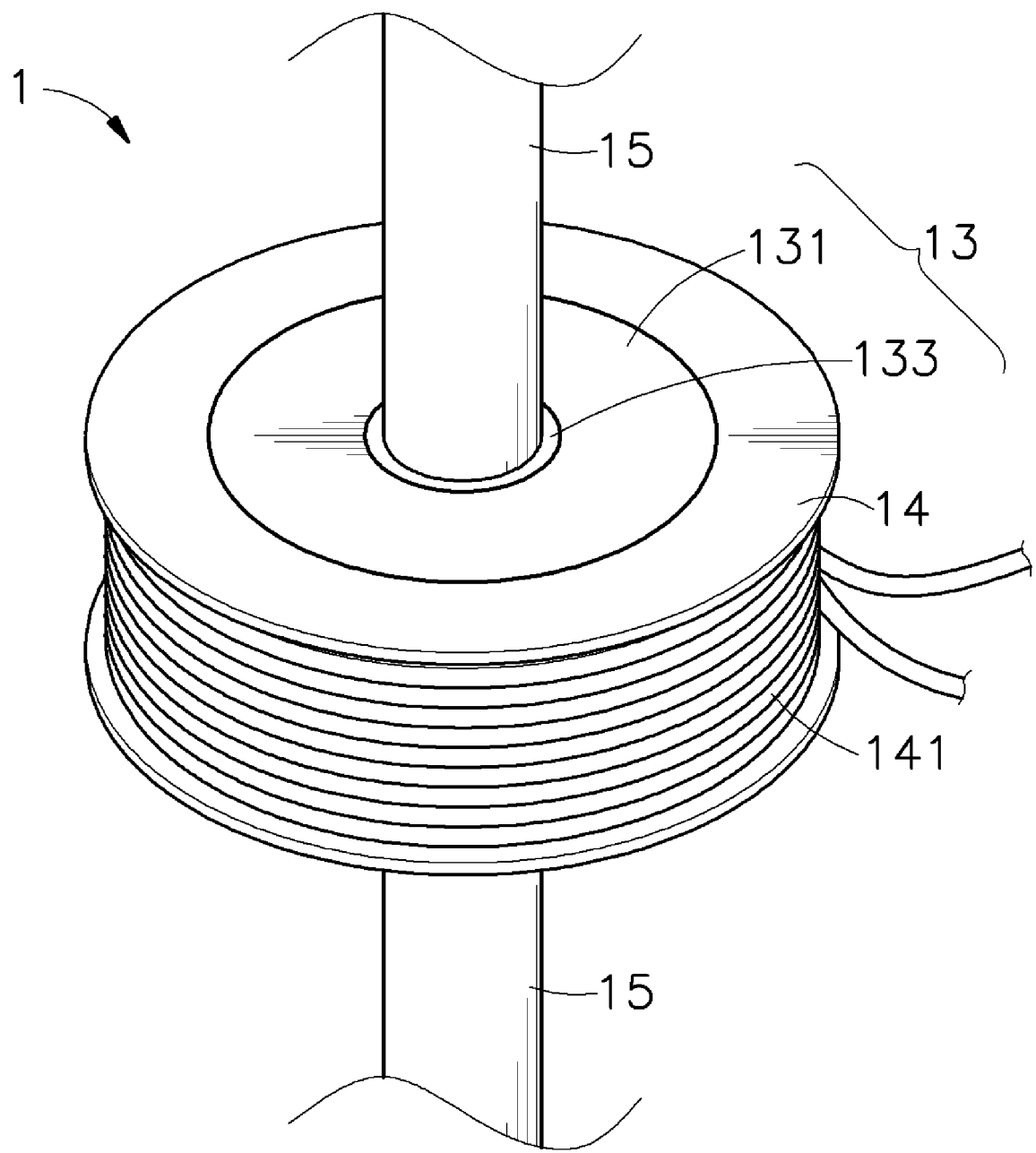
FIG. 3 is a schematic oblique elevation of the present invention, showing miniature generator fastened to a mounting rod.
Figure 4:
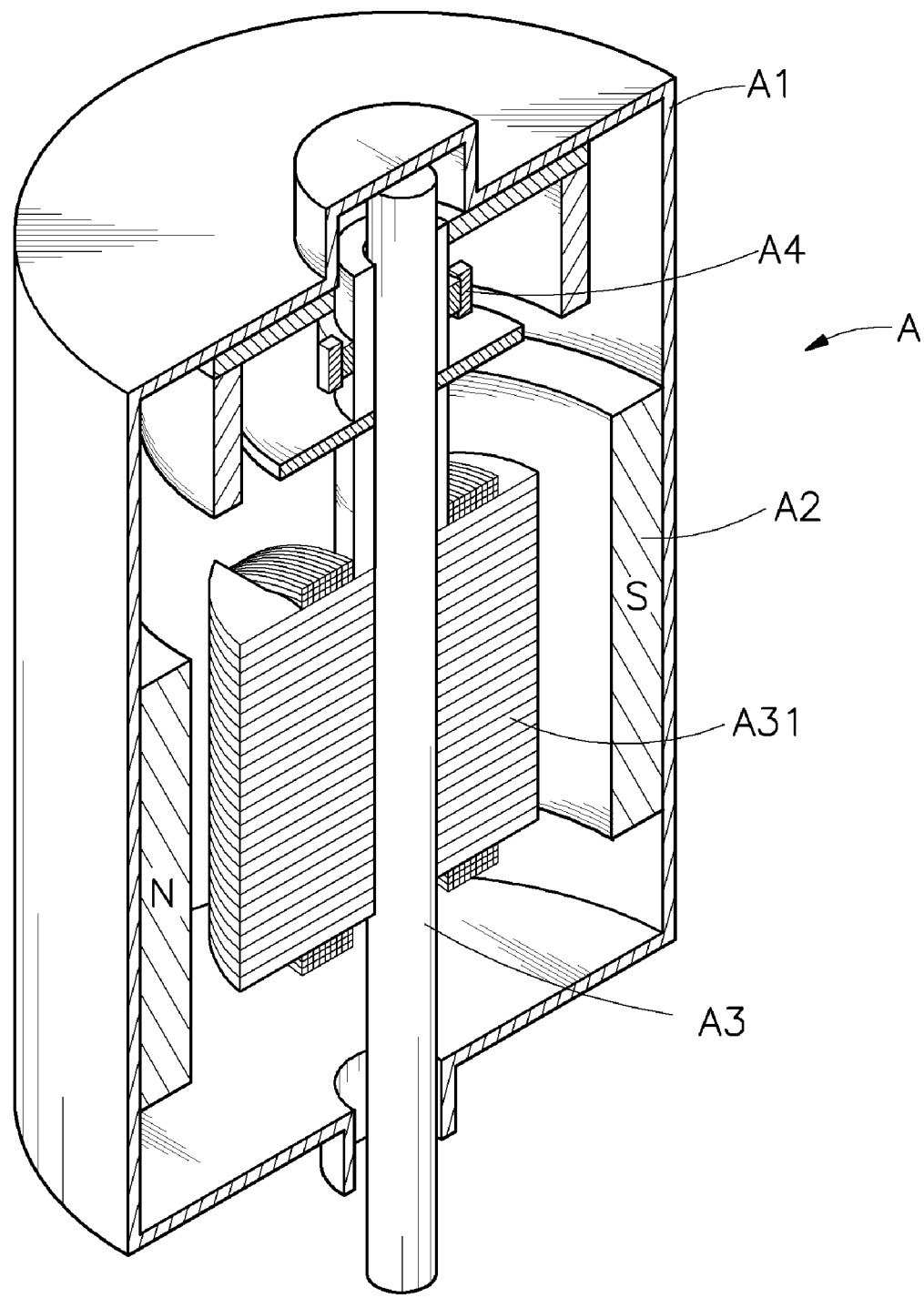
FIG. 4 is a sectional elevation of a miniature generator according to the prior art.

Referring to FIGS. 1~3, a miniature generator 1 in accordance with the present invention is shown comprised of a permanent magnet 11, a match 12, a carrier 13 and a winding holder 14.

The permanent magnet 11 has a center through hole 110, and a peripheral notch 111 in communication with the center through hole 110. The match 12 has a center through hole 120 corresponding to the center through hole 110 of the permanent magnet 11. The match 12 is joined to the permanent magnet 11, keeping the permanent magnet 11 in a slightly unbalanced condition. The carrier 13 comprises a top cover shell 131, a bottom cover shell 132, and a tubular shaft 133 connected between the top cover shell 131 and the bottom cover shell 132. The tubular shaft 133 is inserted through the center through hole 110 of the permanent magnet 11 and the center through hole 120 of the match 12 to hold the permanent magnet 11 and the match 12 inside the top cover shell 131 and the bottom cover shell 132 (see FIGS. 1 and 2), allowing eccentric rotation of the permanent magnet 11 and the match 12 in the carrier 13. The winding holder 14 is sleeved onto the carrier 13, having wound thereon multiple windings 141.

Further, a mounting rod 15 is inserted through the tubular shaft 133 of the carrier 13 (see FIGS. 1~3) to secure the miniature generator 1 to a motion device (not shown). The top cover shell 131 has a center through hole 130 in axial alignment with the inner diameter of the tubular shaft 133 for the mounting of the mounting rod 15.

The match 12 achieves optimal matching with the permanent magnet 11, keeping the permanent magnet 11 in the so-called slightly unbalanced condition.

After a user affixed the miniature generator 1 to a motion device by means of the mounting rod 15, the motion of the motion device causes the permanent magnet 11 to rotate in the carrier 13. Because the permanent magnet 11 is kept in a slightly unbalanced (eccentric) condition and because of the effect of gravitation, the permanent magnet 11 is rotated in the carrier 13 during movement of the motion device. Further, the rotating friction between the permanent magnet 11 and the carrier 13 affects the efficiency of rotation of the permanent magnet 11 directly, i.e., the smaller the friction is the higher the efficiency of rotation will be.

Further, during rotation of the permanent magnet 11 in the carrier 13, the magnetic flux in the windings 141 of the winding holder 14 is changed, thereby producing an induction current that is outputted to an external circuit.

As stated above, the miniature generator 1 of the present invention has the permanent magnet 11 kept in a slightly unbalanced (eccentric) condition inside the carrier 13 so that the external force of the motion of the external motion device causes the permanent magnet 11 to rotate in the carrier 13, thereby inducing the windings 141 of the winding holder 14 to produce an induction current. Under the environment of energy crisis, the miniature generator 1 of the present invention is a cost-effective, safe and environmentally protective design.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A miniature generator comprising:
   a carrier, said carrier comprising a shaft;
   a permanent magnet mounted on said shaft inside said carrier, said permanent magnet having a center through hole coupled to the shaft of said carrier and a peripheral notch;
   a match mounted on said shaft inside said carrier and joined to said permanent magnet to keep said permanent magnet in a slightly unbalanced condition for allowing rotation of said permanent magnet upon movement of said carrier by an external force, said match having a center through hole coupled to said shaft of said carrier; and
   a winding holder sleeved onto a periphery of said carrier, said winding holder having wound thereon multiple windings for inducing an induction current upon rotation of said permanent magnet in said carrier.

2. The miniature generator as claimed in claim 1, wherein said carrier further comprises a top cover shell and a bottom cover shell, and said shaft is connected between said top cover shell and said bottom cover shell.

3. The miniature generator as claimed in claim 2, wherein said shaft is a tubular member for mounting of a mounting rod for securing said miniature generator to an external motion device.

* * * * *